July 18, 1961 H. C. OPPEL 2,992,523
HAY CONDITIONER
Filed Oct. 1, 1959 4 Sheets-Sheet 1
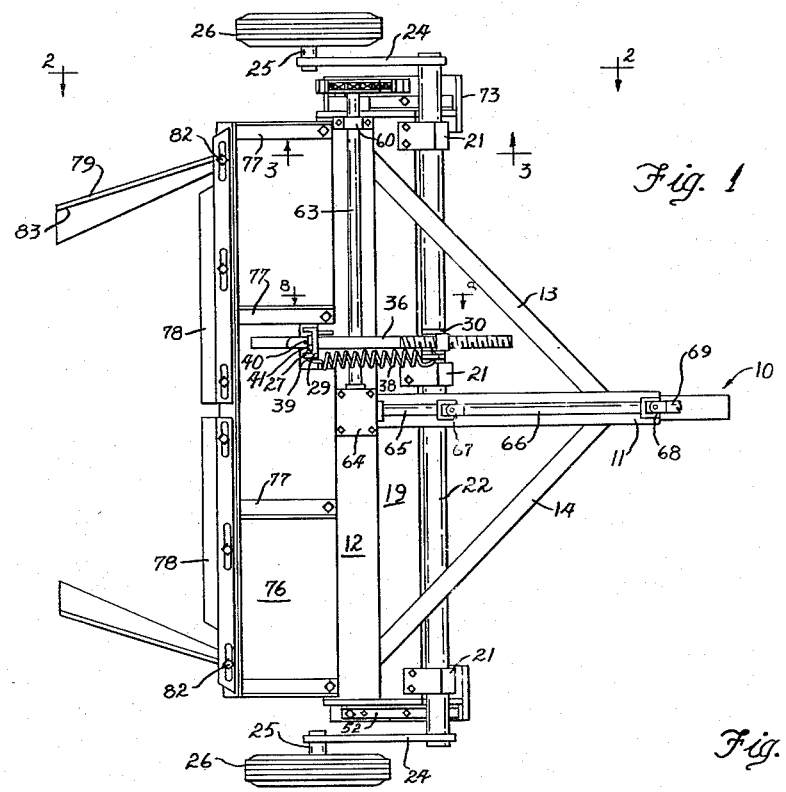
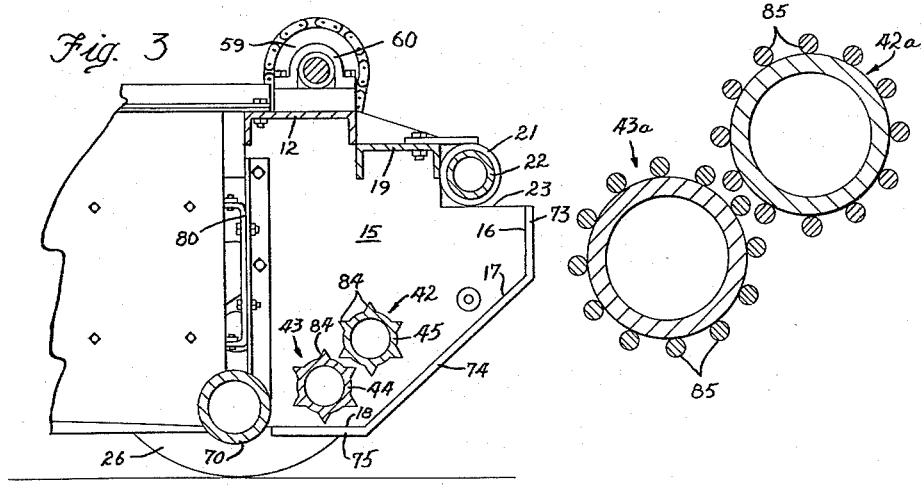
INVENTOR.
Heinz Carl Oppel
BY Treadwells
Atty.

July 18, 1961

H. C. OPPEL 2,992,523

HAY CONDITIONER

Filed Oct. 1, 1959

INVENTOR.
Heinz Carl Oppel
BY
Atty.

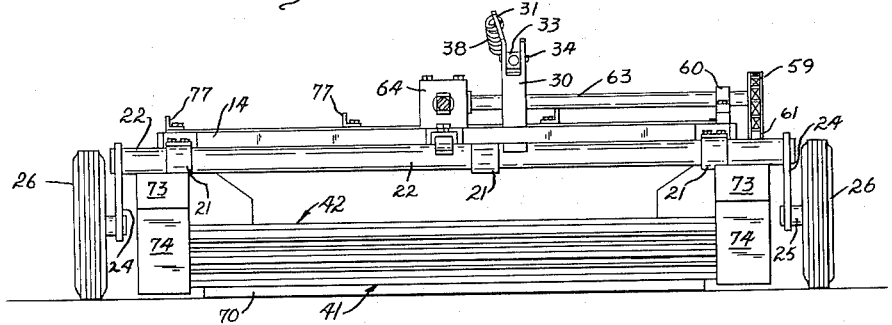
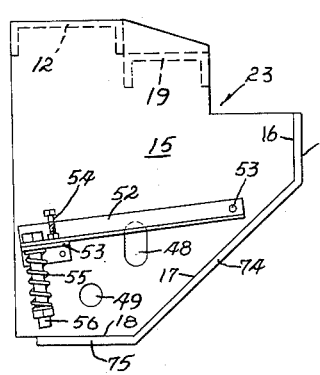
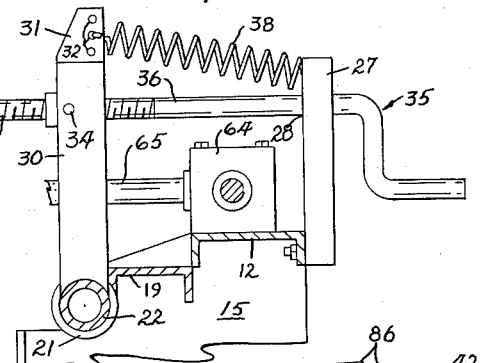
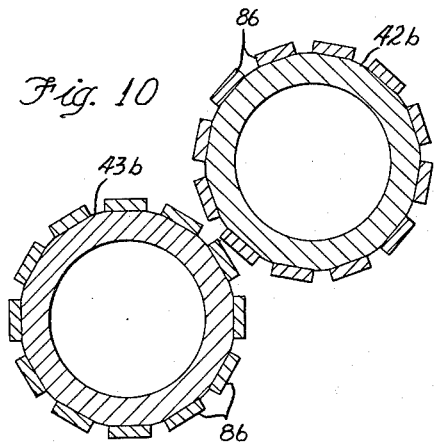
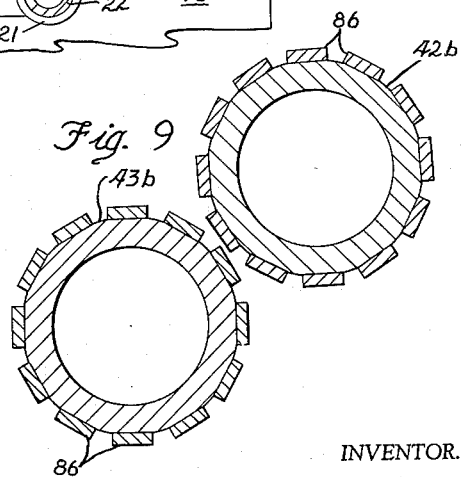

United States Patent Office 2,992,523
Patented July 18, 1961

2,992,523
HAY CONDITIONER
Heinz Carl Oppel, 212 S. 5th St., Boise, Idaho
Filed Oct. 1, 1959, Ser. No. 843,724
2 Claims. (Cl. 56—1)

This invention relates to a novel hay conditioner to crush or crimp freshly mown hay in the field.

Briefly, this invention comprises a trailer attachment for a farm tractor having two lateral rollers driven by power take-off means. The rollers are of a configuration so as to either crimp or crush the stalks of hay as the machine passes along the rows of mown hay. Novel drive and counterbalance structure is utilized to protect the rollers from rock damage.

It is an object of this invention to provide a hay conditioner which is readily adapted to crush or crimp hay as desired.

It is another object of this invention to provide a machine which will condition hay for feed so as to make it more palatable and more easily digestable.

It is a further object to provide such a machine with yielding means to protect the crimping rollers from rock damage.

These and further objects will become evident from the following illustrative embodiment.

In the drawings:

FIGURE 1 is a top plan view of the hay conditioner;

FIGURE 3 is a sectional view taken along line 3—3 in FIGURE 1 with the rear guides broken away;

FIGURE 6 is a view of the end plate construction showing frame connections;

FIGURE 7 is a front view of the machine in conditioning position;

FIGURE 8 is a fragmentary sectional view taken along line 8—8 in FIGURE 1;

FIGURE 9 is an enlarged view similar to FIG. 3, showing a second embodiment of the rollers in a crimping relationship;

FIGURE 10 is similar to FIGURE 9, showing the rollers in a crushing relationship; and FIGURE 11 is a view similar to FIGURE 9 showing a third possible configuration of the rollers.

Figure 2:
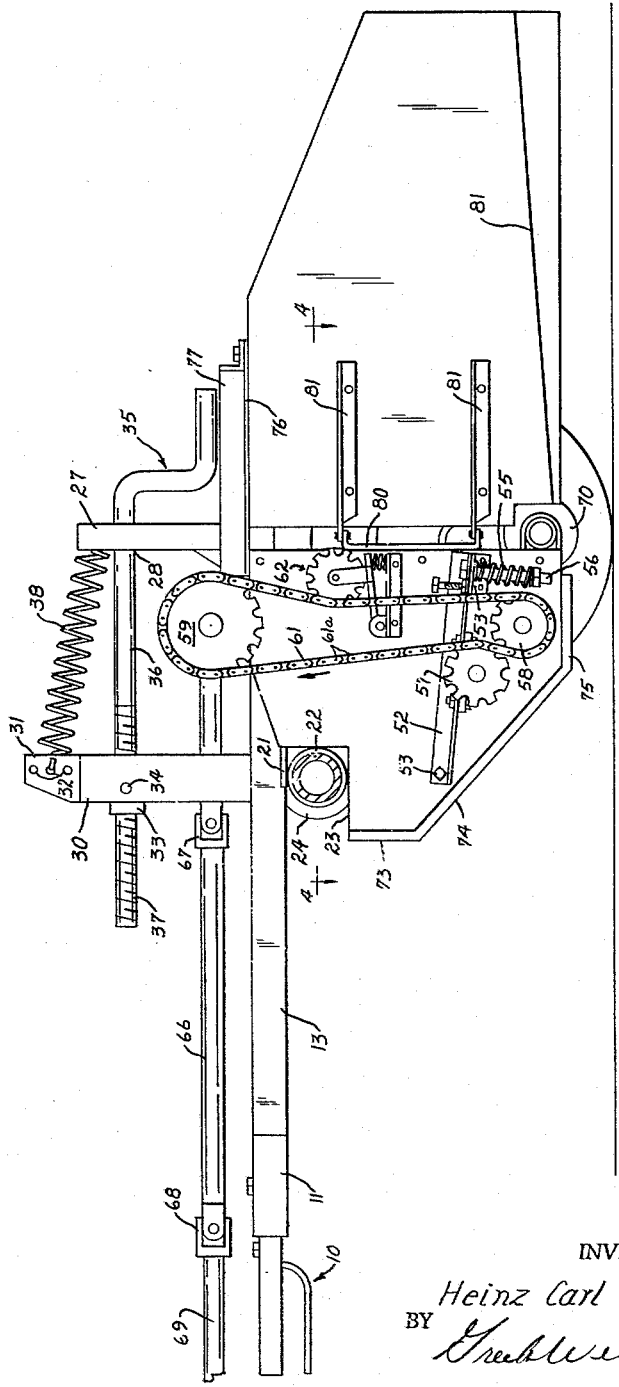
FIGURE 2 is a sectional view taken along line 2—2 in FIGURE 1.
Figure 4:
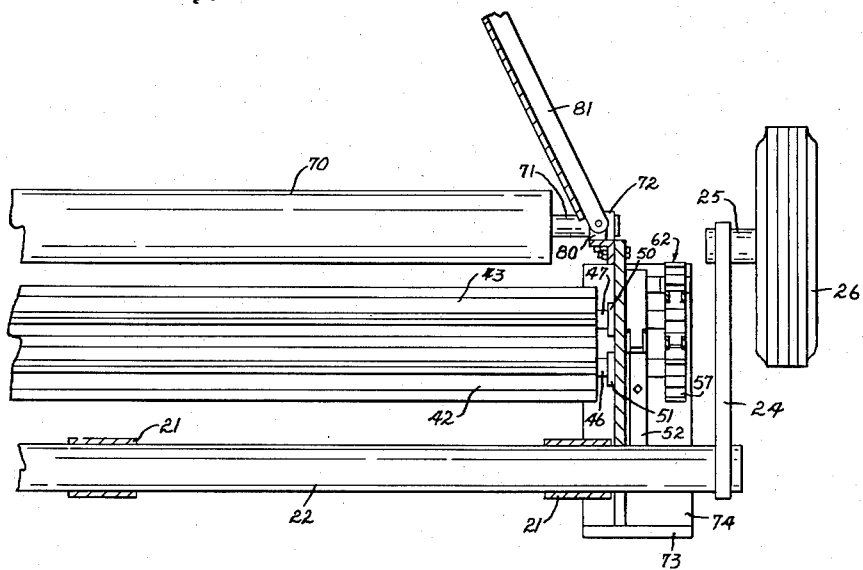
FIGURE 4 is a fragmentary sectional view taken along line 4—4 in FIGURE 2.
Figure 5:
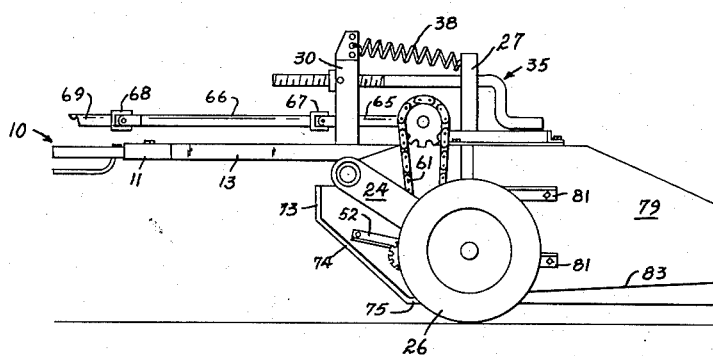
FIGURE 5 is a side view taken at the top side of FIGURE 1.

Referring now to the drawings, there is shown a hay conditioner adapted to be towed by a conventional tractor (not shown) by means of a flexible hitch 10 attached to a tow bar 11 (FIGURE 1 and 2). Bar 11 is attached to a cross frame 12 by a weld or equivalent method. Side supports 13, 14 also extend angularly between the forward portion of bar 11 and cross frame 12 to add rigidty to the towing structure. The cross frame 12 is made of a rather wide channel iron and has attached at each end a vertical plate 15. The outline of plates 15 is best seen in FIGURE 6. It comprises a vertical front surface 16, a sloping front surface 17 and a lower surface 18. Also fixed to the end plates is a second transverse channel iron 19 which is mounted slightly below cross frame 12 and forms therewith a forward cover for the machine. Mounted along channel iron 19 by means of bolts 20 are three bearing members 21, the center one of which is mounted slightly off center in the machine. Bearing members 21 rotatably carry a tubular cross-shaft 22 which extends beyond end plates 15 through a square notch 23 cut above front surface 16. Welded to the ends of cross-shaft 22 are struts 24 which extend downward at an angle and support the bearing structure 25 for wheels 26.

An upright member 27 is welded to cross frame 12 near its center and has a circular opening 28 near the top of its upright channel section 29. A second upright member 30 is fixed to cross-shaft 22 adjacent to center bearing member 21 and is generally square in cross-section. One edge 31 extends beyond the upper square cross-section and is provided with three vertically positioned holes 32. An opening is also provided in the square cross-section of upright member 30 to pivotally mount a transverse nut 33 by means of pins 34. A crank 35 having an extended shaft 36 threaded at end 37 is mounted through opening 28 and is threadably engaged by nut 33. A tension spring 38 is connected between one of the holes 32 and a hole 39 in upright member 27 near opening 28. The shaft 36 of crank 35 is prevented from moving forwardly with respect to upright member 27 by a cotter pin 40 and retaining washers 41.

The foregoing elements constitute the main framework of the machine and provide a vertically adjustable framework. By turning crank 35, the wheels 26 may be raised or lowered to position the framework. Spring 38 serves as a counterbalance and tends to retain wheels 26 in their lower position, while opening 28 allows free movement of shaft 36 in one direction to accommodate sudden lifting shocks on the framework, but limits the movement of upright member 27 in the rearward direction which would tend to lift the wheels 26.

The actual crimping mechanism will now be described. This consists essentially of two rollers 42, 43 which are rotatably mounted between end plates 15. Rollers 42, 43 have identical cross-sectional configurations which may be chosen from several alternatives as will be described later. The rollers 42, 43 comprise an elongated hollow tube 44, 45 respectively, closed at each end and having shaft extensions 46, 47 respectively at both ends for support purposes.

To support rollers 42, 43 there are provided two holes 48, 49 in each end plate 15: an elongated hole 48 and a smaller hole 49 positioned below and to the rear of hole 48. The end plate construction of ends 15 are mirror image and the bearing support for rollers 42, 43 are identical; therefore only one will be fully described now. Taking the lower end plate in FIGURE 1, it has a first bearing 50 mounted over hole 49 which rotatably supports extension 47 on roller 43. This bearing 50 fixedly locates the position of roller 43. A second bearing 51 is mounted upon a pivoted lever 52 which is pivoted at 53 upon the forward end of side plate 15 (see FIGURES 2 and 6). Bearing 51 is located so that its path of travel coincides with hole 48. Extension 46 of roller 42 is journaled by bearing 51, which allows free movement between rollers 42, 43. Downward movement of lever 52 is limited by a stop bar 53 fixed to end plate 15 which is contacted by an adjustable screw 54 threadably engaged through lever 52. Screw 54 is adjusted to prevent metal to metal contact. Upward movement of lever 52 is governed by a compression spring 55 which engages stop bar 53 and a movable bolt 56 that is fixed to lever 52 and extends downwardly through stop bar 53.

The upper end plate 15 in FIGURE 1 has the same construction just described which has been designated by identical numerals in the drawings. It further comprises the roller drive assembly which shall now be described. As seen in FIGURES 2, extensions 46, 47 on rollers 42, 43 are longer on this side than on the previously described side. Identical bearing structure is utilized on each side, but these elongated extensions 46, 47 have sprockets 57, 58 fixed at their ends. A third sprocket 59 is rotatably journaled by a bearing mount 60 fixed to the cross channel member 12. A chain 61 engages each sprocket 57, 58, 59 so as to transmit a driving force from sprocket 59 to sprockets 57 and 58. The direction of rotation of each sprocket is indicated by an arrow in FIGURE 2. The result is that rollers 42, 43 rotate in opposite directions with the direction of travel of their adjacent surfaces being in rearward direction. There is also provided a spring biased chain tightener 62 mounted upon end plate 15 which prevents slack from developing in chain 61 and also insures engagement with sprocket 57 at all times. This is necessary since chain 61 acts as a timing chain as will be described later and since sprockets 57, 58 can be separated should rollers 42, 43 pick up a rock.

Sprocket 59 is fixed to a shaft 63 rotatably journaled in bearing mount 60 and extending to a centrally located gear box 64 mounted upon cross frame 12 as seen in FIGURE 1. Gear box 64 is of the usual bevel gear construction for right angle transmission of power and will not be further described. An input shaft 65 for gear box 64 extends to a power shaft 66 which is connected by means of universal joints 67, 68 to power takeoff shaft 69 of the tractor. The universal joints allow movement of the framework without interrupting power to the rollers.

In order to guide the floating action of the framework, a smooth elongated roller 70 is located between end plates 15 and to the rear of roller 43. Roller 70 is also hollow, having its ends closed and having extensions 71 at either end. Extensions 71 are journaled by bearing supports 72 positioned upon end plates 15. The supports 72 are located so that a specified clearance (one inch, for example) is always maintained between the lower portion of roller 43 and the ground engaging portion of roller 70. In operation, crank 35 is adjusted so as to position roller 70 on the ground, which will insure floating action of the framework should uneven terrain or an obstruction be engaged.

As seen in FIGURES 2, 3 and 6, end plates 15 have lateral plates 73, 74, 75 welded to surfaces 16, 17 and 18 respectively which extend on either side of the plates 15. These plates serve two purposes. They protect the bearing and drive assemblies from dirt and obstruction by the material being crimped. They also allow floating action over large obstructions, since plate 74 will ride up a rack or other vertically extending article and will therefore protect rollers 42, 43 before the article is engaged by roller 70.

The rear portion of this machine comprises an upper cover plate 76 bolted to cross frame 12 and stiffened by angle irons 77 and a beveled lateral edging 78 bolted to cover plate 76. Side guides 79 are pivotally mounted upon brackets 80 at the rear edge of each side plate 15 and extend rearwardly of cover plate 76 to compact the crimped articles. Stiffeners 81 give added rigidity to guides 79, which are located in a converging arrangement by means of bolts 82 fastened to cover plate 76 and edging 78. Guides 79 are bent at 83 to better guide the crimped crops.

The first configuration of rollers 42, 43, used in all the assembly figures and best seen in FIGURE 3, is a V-type configuration. Elongated angles 84 are welded to hollow tube 44 or 45 to form a star shaped configuration. The rollers 42, 43 are positioned by screws 54 so as to allow slight clearance between the meshing angles of the rollers 42, 43. This type of crimper is particularly useful in rock areas, since small rocks can pass through the spring loaded rollers 42, 43, due to the clearance between angles and a larger rock will not be fed into the design if it is large enough to do any damage.

A similar construction is illustrated in FIGURE 11. Here elongated circular rods 85 have been welded to rollers 42a, 43a. The clearance between the rollers 42a, 43a is set so as to prevent touching of the rods 85 while they mesh. This configuration allows for softer crushing of more delicate crops. Both configurations in FIGURES 3 and 11 have only one timed relationship as shown in the figures, wherein the projections are in mesh. This timing is maintained by chain 61.

A third type of configuration is shown in FIGURES 9 and 10 wherein flat bars 86 are welded along the periphery of rollers 42b, 43b. The bar width is greater than the peripheral gap between the bars and the center to center distance between bars 86 is twice the distance between pins 61a in chain 61. Therefore, two timed relationships between rollers 42b, 43b are possible. The first is shown in FIGURE 9 wherein the bars 86 of each roll alternate so as to crimp the stalks by applying pressure to alternate sides of the crop as it feeds through rollers 42b, 43b. By disconnecting chain 61 and replacing it upon sprocket 59 one link in advance, the relationship illustrated in FIGURE 10 is obtained wherein bars 86 of both rollers 42b, 43b, are opposite to one another. This results in a crushing action. This dual application allows one set of rollers to be adapted to many variant crop conditions. Metal-to-metal contact is prevented and the pressure between rolls 42b, 43b is regulated by means of screw 54.

In operation, the hay conditioner is pulled along a field of freshly mown hay and the height of roller 70 is adjusted by crank 35 so as to guide the hay between rolls 42, 43, where it is crimped or crushed as desired. The counterbalanced floating action of the frame protects the rollers 42, 43 from damage and follows the ground contour. The conditioned hay is then spread behind the conditioner as it is positioned by guides 79. It may then be picked up in the usual manner when it is dry.

The crimped hay will dry faster in the field and will be more readily eaten by animals, since it will break off easier in their mouths. Crushing the larger stalks makes the hay more easily digestible and easier to chew and will prevent waste of the tough stalk portions as normally occurs when animals are fed unconditioned hay. The hay is not cut by the rollers 42, 43, since the limit means 53, 54 always prevent metal to metal contact in the meshing timed position. The hay is merely bent or, in the case of the embodiment of FIGURE 10, crushed periodically.

It is to be understood that this specific construction illustrated and described in detail is merely illustrative. The scope of this invention is defined only in the annexed claims.

Having described my invention, I claim:

1. In a hay conditioner, a frame, a pair of identical parallel rotatable rollers having peripherally mounted thereon parallel circumferentially spaced rectangular strips, fixed bearing means on said frame adapted to rotatably support the first of said rollers, movable bearing means on said frame adapted to rotatably support the second of said rollers, yieldable means adapted to urge said rollers into a meshing position, fixed stop means on said frame to limit movement of said second roller toward said first roller so as to avoid contact between the rollers and strips in a meshing position, chain and sprocket drive means operative to drive said rollers in opposite directions, the chain link spacing being one half the center to center spacing between said strips, and a cylindrical gauge roller extending across the length of said pair of rollers, said gauge roller being rotatably mounted on said frame parallel to and below the elevation of the lower one of said pair of rollers.

2. In a hay conditioner, a frame floatingly mounted by ground engaging means, a pair of parallel rotatable rollers having peripherally fixed thereto parallel circumferentially-spaced strips, fixed bearing means on said frame adapted to rotatably support one of said rollers, movable bearing means mounted on said frame adapted to rotatably support the second of said rollers, yieldable means adapted to urge said rollers into adjacent positions with respect to each other, fixed stop means on said frame in the path of said movable bearing means adapted to limit movement of said second roller toward said first roller so as to prevent contact between the rollers and strips, drive means operatively connected to said pair of rollers adapted to drive said rollers in opposite directions, and a ground-engaging gauge roller carried by the lower portion of said frame and extending across the length of said pair of rollers at an elevation below the lowest portion of said rollers.

References Cited in the file of this patent

UNITED STATES PATENTS

| | | |
|---|---|---|
| 639,618 | Russell | Dec. 19, 1899 |
| 2,304,811 | Frederickson | Dec. 15, 1942 |
| 2,515,808 | Stoddard | July 18, 1950 |
| 2,811,819 | Heth | Nov. 9, 1957 |
| 2,908,126 | Drydahl | Oct. 13, 1959 |